July 24, 1962 H. P. KRAMER 3,046,346

MULTIPLEX SIGNALING SYSTEM

Filed Dec. 17, 1958 6 Sheets-Sheet 1

INVENTOR
H. P. KRAMER
BY
R. C. Winter
ATTORNEY

July 24, 1962 H. P. KRAMER 3,046,346

MULTIPLEX SIGNALING SYSTEM

Filed Dec. 17, 1958 6 Sheets-Sheet 2

INVENTOR
H. P. KRAMER
BY
ATTORNEY

MULTIPLEX SIGNALING SYSTEM

Filed Dec. 17, 1958 6 Sheets-Sheet 3

INVENTOR
H. P. KRAMER
BY
R. C. Winter
ATTORNEY

INVENTOR
H. P. KRAMER
BY
R. C. Winter
ATTORNEY

INVENTOR
H. P. KRAMER
BY
R. C. Winter
ATTORNEY

INVENTOR
H. P. KRAMER
BY
R. C. Winter
ATTORNEY

3,046,346
MULTIPLEX SIGNALING SYSTEM

Henry P. Kramer, Summit, N.J., assignor to Bell Telephone Laboratories, Incorporated, New York, N.Y., a corporation of New York Filed Dec. 17, 1958, Ser. No. 781,076
7 Claims. (Cl. 179—15)

This invention relates to multiplex signal transmission systems and more particularly to such systems in which different circuits require different bandwidths.

In time division multiplex signal transmission systems, a single broadband facility may serve as the transmission link for a number of input signals from a large number of signal sources sampled on a time division basis. For proper reconstitution of the original signals at the receiving end, it is desirable that each signal be sampled at twice the frequency of the highest signal frequency to be received. Thus, for example, if a 4,000 cycle signal is to be transmitted from each of a number of signal sources, the signal from each of these sources must be sampled successively at a rate of at least 8,000 samples per second for each source. At the receiver, the interleaved amplitude modulated samples derived from each signal source are sorted out and applied to individual low pass filters. The output from the low pass filters is normally a very good reproduction of the original 4,000 cycle signal.

The manner in which signals from a plurality of sources may time share a common transmission channel is disclosed, for example, in Patent 2,936,338 by B. D. James and J. D. Johannesen, issued May 10, 1960.

It may also be desirable to use the same multiplex transmission facilities for the transmission of one or more signals requiring more than the standard 4,000 cycle bandwidth. Thus, for specific example, it may be necessary to transmit a program signal requiring an 8,000 cycle bandwidth through the multiplex transmission system. In order to transmit such a program signal while conforming to the accepted sampling rate, it would be necessary to sample the signal at twice the 8,000 cycle sampling rate employed for the 4,000 cycle signals. This could be accomplished by sampling signals from the broadband signal source more than once in each sampling cycle. Thus in a 24-channel multiplex system, the broadband signal source could be coupled to the first and the thirteenth multiplex sampling gates. With the first and thirteenth sampling gates both being enabled at an 8,000 samples per second rate, the signals transmitted to the receiver may be combined and passed through a low pass filter having a cut-off frequency of about 8,000 cycles to reconstitute the desired broadband signals.

Sampling is effected at uniform intervals, such as permitted in the above specific example, in order to avoid significant distortion otherwise introduced into the reconstituted signal. Various situations may occur, however, in which an existing facility is unable to sample the signal from the broadband source at uniformly spaced intervals. For example, under actual traffic conditions all sampling gates which are enabled at uniform intervals may have been assigned to other service so that a newly introduced broadband source must be assigned to gates which are enabled at nonuniform intervals. Similarly, the existing facility may be such that sampling gates enabled at uniform intervals do not exist; e.g., a system having an odd number of channels does not contain any lesser plurality of gates which are enabled at uniform intervals in successive sampling cycles. The problem is further magnified when it is desired to sample a very broad band source more regularly than twice in each sampling cycle. The ability to sample the broadband signals at a nonuniform rate would therefore introduce considerable flexibility in such systems.

The principal object of the present invention is to eliminate signal distortion which may occur from nonuniform sampling rates.

Another object of the invention is to avoid the distortion which might otherwise occur when a broadband signal is shared by a plurality of multiplex sampling gates which are enabled at a nonuniform rate, thereby permitting greater flexibility in the assignment of narrow band channels for broadband service in a time division multiplex transmission system.

In accordance with one illustrative embodiment of the present invention, the foregoing objects are achieved through the use of special filtering circuits which reduce the distortion introduced by the nonuniform sampling rate. More specifically, it has been discovered that the use of a distinct filter corresponding to each gate sampling a broadband signal at nonuniform intervals, which filters have different transmission characteristics, provides the necessary correction to compensate for the distortion mentioned above. Furthermore, in order to be physically realizable, the distortion compensation circuits must include delay.

In accordance with a broad feature of the invention, a multichannel multiplex system includes circuitry for sampling a signal source at a nonuniform rate, and also includes electrical delay components for eliminating distortion normally resulting from such nonuniform sampling.

In accordance with a specific feature of the invention, the broadband signal may be sampled at a nonuniform rate and, at the receiver of the multiplex system, individual filter circuits are provided for the multiplex channels serving the broadband signal source, each filter having distinct transmission characteristics for the signals transmitted over the respective channels. In accordance with a more specific feature of the invention, first and second filter circuits which provide, respectively, positive and negative phase shifts, receive first and second samples of a broadband signal taken at nonuniform intervals and permit reconstitution of the broadband signal without distortion.

In another illustrative embodiment of my invention, the broadband signal source is assigned to a plurality of gating circuits which are enabled at nonuniform intervals, but the broadband signal source is nevertheless sampled at a uniform rate. Successive samples of the broadband signal are delayed by suitable padding delay circuits and then applied to the available multiplex transmission gates. At the receiver, additional padding delay is employed to restore the signals to an even time spacing, and the signals are thereafter combined and passed through a conventional low pass filter.

In accordance with another specific feature of the invention, therefore, signal samples derived from a broadband signal source are transmitted over a plurality of multiplex channels which are enabled at a nonuniform rate, circuitry is provided for sampling the broadband signal source at a uniform rate, and electrical padding delay components are provided at the transmitter and receiver for matching the uniform sampling rate to the nonuniform timing of the multiplex channels.

A complete understanding of this invention and of these and various other features thereof may be gained from a consideration of the following detailed description and the accompanying drawing, in which.

Figure 1:
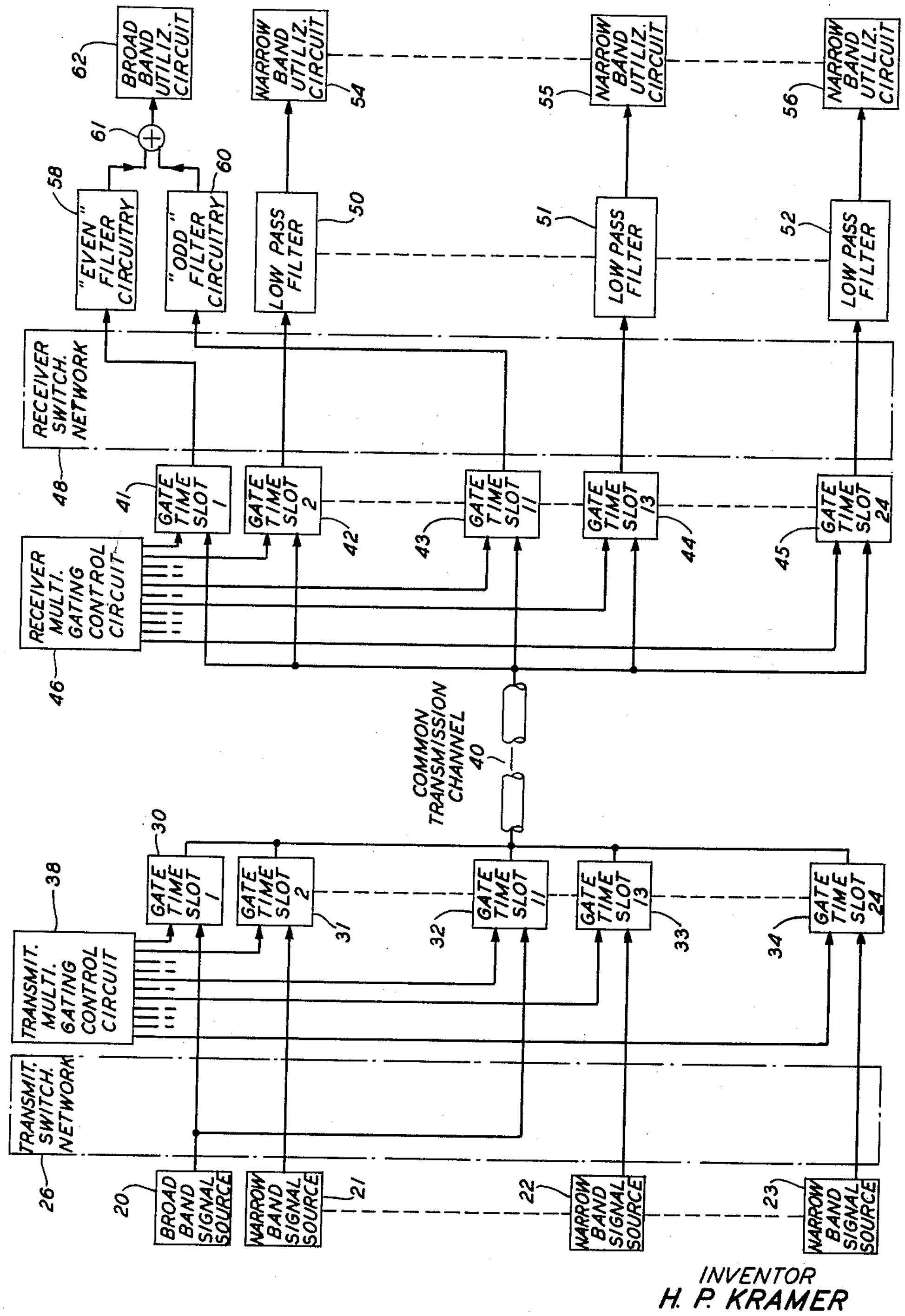
FIG. 1 is an over-all block diagram of a multiplex switching system in accordance with the present invention.

With reference to FIG. 1, the signal sources for the multiplex system are indicated at 20 through 23. Although only four of the signal sources are specifically shown, it is to be understood that the signal transmission facilities of the 24-channel multiplex system may be fully utilized in the transmission of signals from other sources which are not shown. Block 26 represents the transmitter switching network for connecting individual signal sources such as 20 through 23 to the multiplex gates such as those designated by the reference numerals 30 through 34. Equally spaced gating signals are applied from the transmitter multiplex gating control circuit 38 to the individual gates including gates 30 through 34.

The type of gates and gating control circuit utilized in this embodiment of my invention may be in accordance with those disclosed in the aforementioned patent by D. B. James and J. D. Johannesen. Briefly, the gates advantageously may comprise transistors normally reversed-biased with respect to the transmission path and permitted to conduct signals from the associated source to the common transmission channel only upon application thereto of an enabling pulse from the gating control circuit. Each of the gates is enabled in properly timed intervals by the associated gating control circuit including a sequence circuit for application of enabling pulses to the gates in a regular sequence. The sequence circuit may comprise a binary counter circuit as known in the art. The counter is arranged to recycle continuously after a specific number of steps, depending upon the number of gates involved. Each individual step defines the time slot of a particular signal source and the total number of steps together define one cycle of operation of the time division system.

For the purpose of the present application, it is assumed that the signal source 20 is a broadband signal source requiring double the bandwidth of the narrow band sources 21, 22 and 23. It would be desirable to connect the signal source 20 to sampling gates which are enabled at uniform intervals, such as gate 30 enabled in the first period or time slot of the sampling cycle, and gate 33 enabled in the thirteenth time slot. However, gate 33 is utilized for sampling signals from source 22. Similarly, it is assumed that all other evenly spaced gates are in use, and that at the time that service was demanded for the broadband signal source 20, only gates 30 and 32, enabled in time slots 1 and 11, respectively, were available. Accordingly, the transmitter switching network 26 is arranged such that the broadband signal source 20 is connected to gates 30 and 32, operating at nonuniform intervals in time.

Following transmission over the broadband channel 40, the interleaved amplitude modulated pulses are sorted out by gate circuits including gates 41 through 45 under the control of the receiver multiplex gating control circuit 46. The narrow band signal samples are applied through the receiver switching network 48 to suitable low pass filters, such as filters 50, 51 and 52, and through the filters to the narrow band utilization circuits such as those shown at 54, 55 and 56. The signals from gates 41 and 43, receiving signal samples taken from the broadband source 20 in time slots 1 and 11 at the transmitting end, are applied through the "even" filter circuitry 58 and the "odd" filter circuitry 60, combined in a final adder circuit 61, and applied to the broadband utilization circuit 62.

As known in the art, when samples of a band limited signal are taken at uniformly spaced intervals at the so-called Nyquist rate, which provides for the number of samples per second of a particular signal that must be taken at uniform intervals in order to achieve a perfect reconstruction of the signal, the signal may be regained from its samples by passing the samples through a filter. The filter in turn ideally leaves the spectrum of the samples unaltered within the band but eliminates all components at higher frequencies.

If the above procedure is followed, with the exception that the samples are taken at nonuniformly spaced intervals, the resultant signal from the filter will be a distorted version of the original signal. I have discovered that this distortion may be corrected in accordance with one embodiment of this invention by the provision of a distinct filter for each signal sample with addition of the outputs from the several distinct filters.

This possibility is shown hereinafter with respect to two signal samples per sampling cycle taken at nonuniform intervals. In this instance distinct filters receive the signal samples taken by the respective sampling gates assigned to the broadband signal source. The samples received through one of the gates are designated the "even" samples and those received through the other gate are designated the "odd" samples.

The filter receiving the "even" samples is designed to have a cut-off at the band pass frequency and a complex transfer function $$\psi_0(f)=\frac{1}{\cos \pi\alpha}e^{-\pi j\alpha f/|f|}$$

The other filter which receives the "odd" signal samples has a similar cut-off and a complex transfer function $$\psi_1(f)=\frac{1}{\cos \pi\alpha}e^{\pi j\alpha f/|f|}$$

Figure 2A:
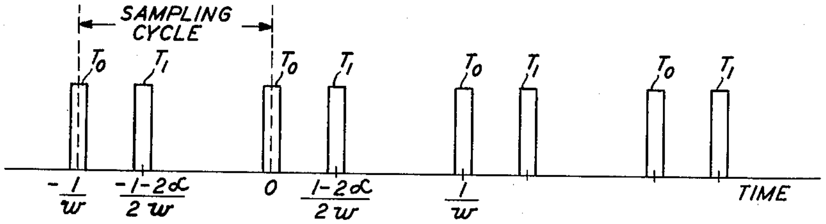
FIGS. 2A, 2B, 2C, 2D and 2E represent various pulse and wave forms of sampled signals in the circuit of FIG. 1.

The complex transfer functions for the above reconstructing filters may be derived as follows: Consider the sequence of sampling pulses shown in FIG. 2A in which samples of the broadband signal are taken in two nonuniformly spaced time slots in each sampling cycle. With a sampling rate at the frequency $w$, samples are taken in time slot $T_0$ at 0, $1/w$, $2/w$, etc., and in time slot $T_1$ at $1/2w-\alpha/w$, $3/2w-\alpha/w$, etc., where $\alpha/w$ denotes the amount by which the time slots are removed from a uniform interval between time slots. The interval between samples taken in time slot $T_0$ will be the same in successive cycles, as will the interval between samples taken in time slot $T_1$. Thus, as noted in FIG. 2B, the samples taken in time $T_0$ of successive cycles, denoted the "even" samples, are uniformly spaced-apart. Similarly, in FIG. 2C, the samples taken in time $T_1$ of each cycle, denoted the "odd" samples, are uniformly spaced-apart. The two subsequences $T_0$ and $T_1$ are periodic functions of time, each having the period $2/w$. Therefore, $T_0$ and $T_1$ can be expanded in a Fourier series:

$$T_0(t)=\Sigma a_n e^{\pi jnwt} \quad (1)$$

in which $a_n$ is the $n$th Fourier coefficient.

It is assumed that samples occurring in the subsequence $T_1$ appear at nonuniform intervals with respect to $T_0$ samples. This may be expressed as $$T_1(t)=T_0\left(t+\frac{1-2\alpha}{2w}\right)$$

Thus the Fourier expansion of $T_1$ is given by $$T_1(t)=\sum a_n e^{\pi jn\frac{(1-2\alpha)}{2}} e^{\pi jwt} \quad (2)$$

The result $M_0(t)$ of modulating a signal $S(t)$ by $T_0(t)$ is thus $$M_0(t)=\Sigma a_n S(t) e^{\pi jnwt} \qquad (3)$$

Figure 2B:
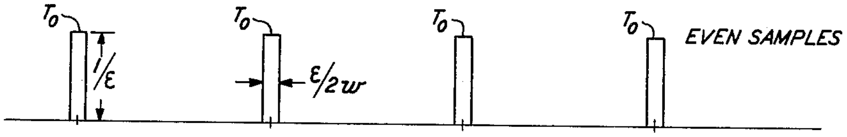
Figure 2C:
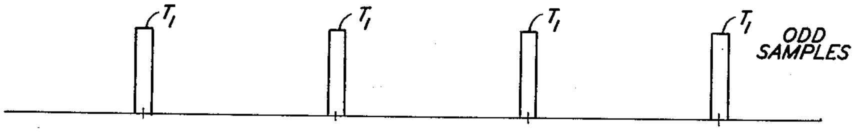
Figure 2D:
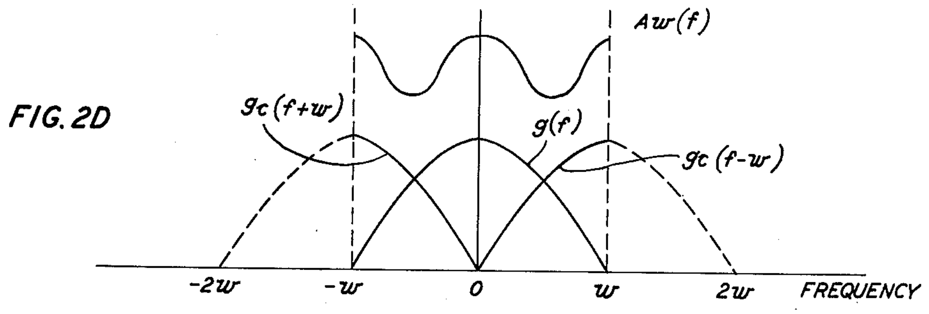
Figure 2E:
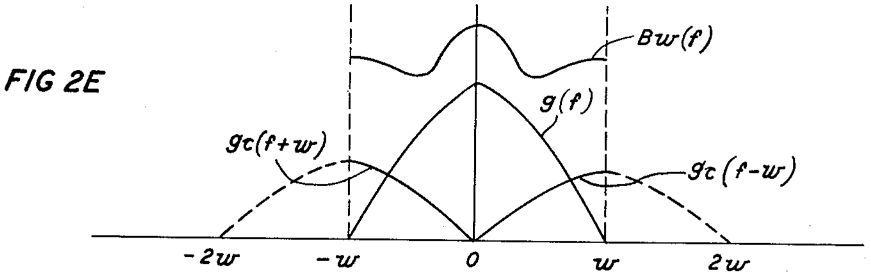

If the spectral density of the signal $S(t)$ is represented by $g(f)$, FIGS. 2D and 2E, and that of the modulated signal resultant $M_0(t)$ is given by $A(f)$, the following relationship maintains:

$$A(f)=\sum a_n g\left\{f-\frac{nw}{2}\right\} \qquad (4)$$

Similarly, if the result of modulating the signal $S(t)$ by $T_1(t)$ is denoted by $M_1(t)$ and the corresponding spectral density is denoted by $B(f)$, the analogous expression for $B(f)$ is $$B(f)=\sum a_n e^{\pi jn\frac{(1-2\alpha)}{2}} g\left\{f-\frac{nw}{2}\right\} \qquad (5)$$

From the foregoing it is found that the Fourier coefficient $a_n$ may be expressed as follows:

$$a_n=\frac{w}{2}\int_{-1/w}^{1/w} T_0(t)e^{-\pi jnwt}dt \qquad (6)$$

$$=\frac{1}{4}(1+(-1)^n)\frac{\sin \pi n/4}{\pi n/4} \qquad (7)$$

where $1/\epsilon$ is the height and $\epsilon/2w$ the width of each individual pulse, such as that sampled in time slot $T_0$, FIG. 2B.

In addition, it may be shown that $a_{2n+1}=0$. Therefore the spectral density of the modulated signal in the even sampling intervals conforms to the following equation:

$$A(f)=\Sigma a_{2n}g(f-nw) \qquad (8)$$

and the spectral density of the modulated signal in the odd sampling periods conforms to the following equation:

$$B(f)=\Sigma a_{2n}e^{\pi jn}e^{-2\pi jn^{\alpha}}g(f-nw) \qquad (9)$$

If the modulated signal $A(f)$ is limited to absolute frequencies $|f|$ equal to or less than the maximum in-band frequency $w$ and if the modulated signal $B(f)$ is similarly limited, then the following equations may be derived:

$$A_w(f)=a_{-2}g_c(f+w)+a_0g(f)+a_2g_c(f-w) \qquad (10)$$

and $$B_w(f)=-a_{-2}e^{2\pi j\alpha}g_c(f+w)+a_0g(f)-a_2e^{-2\pi j\alpha}g_c(f-w) \qquad (11)$$

where $g_c(f+w)$ represents $g(f+w)$ with a clipped lower sideband, as indicated in FIG. 2D, and $g_c(f-w)$ represents $g(f-w)$ with a clipped upper sideband.

For values of the frequency $f$ between 0 and $w$, these equations reduce to the following:

$$A_w(f)=a_0g(f)+a_2g_c(f-w) \qquad (12)$$

$$B_w(f)=a_0g(f)-a_2e^{-2\pi ja\alpha}g_c(f-w) \qquad (13)$$

and solving Equations 12 and 13 for $g(f)$, the following resultant is provided:

$$g(f)=\frac{1}{a_0}\frac{e^{-2\pi j\alpha}A_w+B_w}{1+e^{-2\pi j\alpha}} \qquad (14)$$

Similarly, for values of the frequency $f$ between $-w$ and 0, the spectral density of the signal in even sampling intervals may be indicated as follows:

$$g(f)=\frac{1}{a_0}\frac{e^{2\pi j\alpha}A_w+B_w}{1+e^{2\pi j\alpha}} \qquad (15)$$

It may be shown that the coefficient $a_0$ in the particular selected instance equals 1/2 and noting that $f/|f|=1$ for $f$ greater than 0 and $f/|f|=-1$ for $f$ less than 0, the expressions for $g(f)$ indicated in Equations 14 and 15 may be combined in the following form:

$$g(f)=\frac{e^{-\pi j\alpha f/|f|}A_w}{\cos \pi\alpha}+\frac{e^{\pi j\alpha f/|f|}B_w}{\cos \pi\alpha} \qquad (16)$$

The necessary filter characteristics to regain the original signal may be found from Equation 16, such that the even sample pulses will pass through a filter with cut-off at $w$ and complex transfer function $$\Psi_0(f)=\frac{1}{\cos \pi\alpha}e^{-\pi j\alpha f/|f|} \qquad (17)$$

and the odd sample pulses through a filter with cut-off at $w$ and complex transfer function $$\Psi_1(f)=\frac{1}{\cos \pi\alpha}e^{\pi j\alpha f/|f|} \qquad (18)$$

with the outputs of the two filters being added in a final adder circuit to provide $g(f)$, the spectral density of the original signal $S(t)$.

The requisite filter characteristics also may be expressed in terms of the time response of the filter network to a brief pulse of unity amplitude. The corresponding impulse responses for the filters as derived hereinbefore are given by $$a_0(t)=\frac{2w}{\cos \pi\alpha}\left\{\frac{\sin 2\pi w(t-\alpha/2w)+\sin \pi\alpha}{2\pi wt}\right\} \qquad (19)$$

and $$a_1(t)=\frac{2w}{\cos \pi\alpha}\left\{\frac{\sin 2\pi w(t+\alpha/2w)-\sin \pi\alpha}{2\pi wt}\right\} \qquad (20)$$

It may be shown in similar fashion that a signal may be reproduced without distortion from more than two samples per sampling cycle taken at nonuniform intervals.

Figure 3:
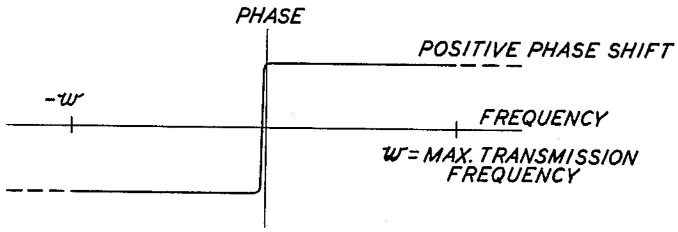
FIGS. 3 and 4 represent theoretically ideal phase characteristics for the "odd" and "even" filter circuits employed in the circuit of FIG. 1.
Figure 4:
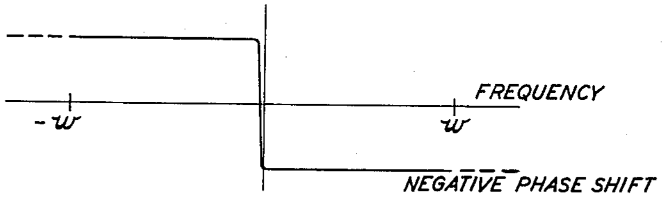

The significance of the Expressions 17 and 18, representing the characteristics of the desired correction filters, is illustrated graphically in FIGS. 3 and 4. Thus, for example, the filter 58 of FIG. 1 has a phase characteristic as indicated in FIG. 3 which satisfies the complex transfer function (Equation 17). In addition, the "odd" filter circuit 60 of FIG. 1 has a phase characteristic which is of the general form indicated in FIG. 4, satisfying the complex transfer function (Equation 18).

With reference to the characteristics of FIGS. 3 and 4, it may be noted that the phase shift in FIG. 3 is positive to the right of the ordinate axis, whereas the characteristic shown in FIG. 4 is negative to the right of the ordinate axis. These two characteristic curves indicate that the filter 58 of FIG. 1 must have a positive phase characteristic and that the filter circuit 60 must have a negative phase characteristic.

In the realization of characteristics shown in FIGS. 3 and 4, it is helpful to introduce additional delay in order to simplify the problem of physical realization. In this regard, it may be noted that a perfect delay circuit, which delays all frequencies equally, introduces no distortion in a transmitted signal. The only effect of such a delay circuit is to increase the time of transmission of the message by a slight amount.

Figure 5:
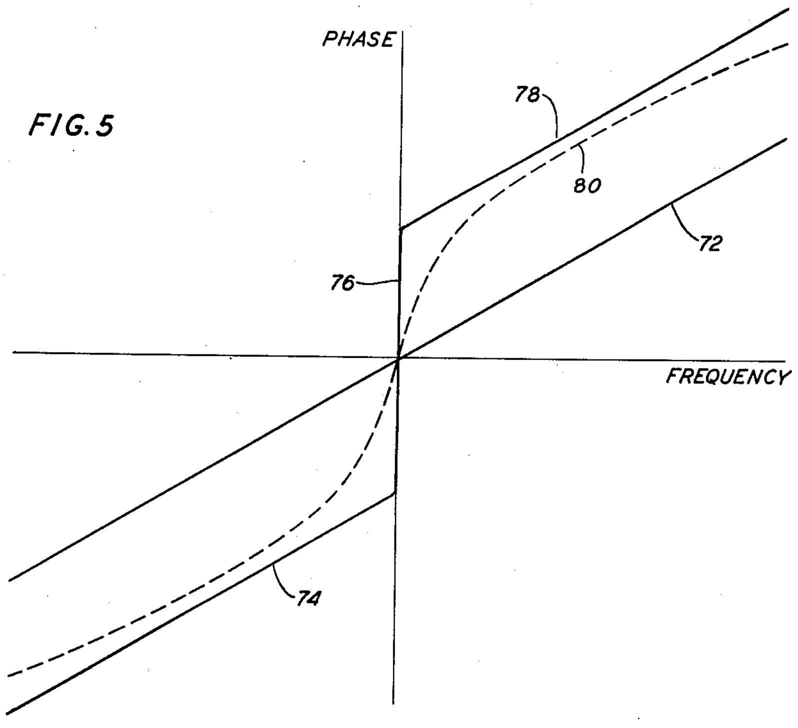
FIGS. 5 and 6 are phase characteristics which also include delay.

The phase versus frequency characteristic of a perfect delay circuit is indicated by the straight line 72 in FIG. 5. It may be noted that the slope of the characteristic 72 is determined by the scale factors of the ordinate and abscissa variables. The reason for the slope of the characteristic is that at higher frequencies a given amount of delay introduces a greater angular shift in the signal.

When the phase characteristic of FIG. 3 is superimposed on the linear characteristic 72 of FIG. 5, the characteristic represented by the three lines 74, 76 and 78 is produced. Now, while it is difficult to realize a filter having the characteristics shown in FIG. 3, a moderately good approximation of the characteristic shown in FIG. 5 by the lines 74, 76 and 78 may be readily constructed. The phase versus frequency characteristic of such a filter is shown by the dashed line plot 80 in FIG. 5.

Figure 6:
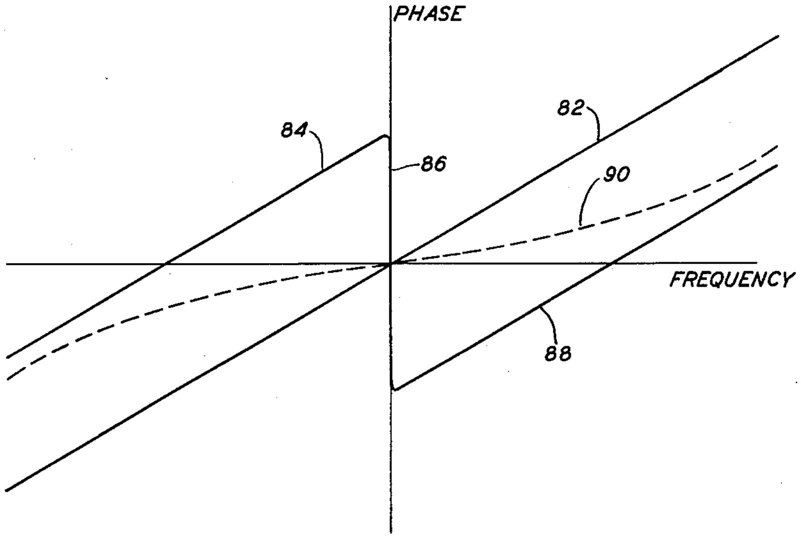

With reference to the plot of FIG. 6, the straight line 82 represents the phase versus frequency characteristic of a perfect delay line. The superposition of the characteristic shown in FIG. 4, with the linear delay characteristic 82, produces the characteristic designated 84, 86, 88 in FIG. 6. A fair approximation of this characteristic is provided by the dashed line plot 90 of FIG. 6.

The type of filter structure which may be employed to realize the characteristics shown in plots 80 and 90 of FIGS. 5 and 6, respectively, is discussed at pages 247 and 248 of F. E. Terman's Radio Engineers' Handbook, McGraw-Hill Book Company, Incorporated, New York, 1943. The filters are in the form known as bridged-T latticed configurations. FIG. 113 on page 247 of this text indicates characteristics which have the form shown in the positive quadrants for the characteristics 80 and 90 of FIGS. 5 and 6, respectively.

The filters 58 and 60 of FIG. 1 may also be realized by circuits of the general form shown in FIG. 5 of A. D. Blumlein et al. Patent 2,263,376. The method of constructing filters disclosed in the Blumlein et al. patent is based on the so-called "impulse response" characteristics of the required filters. These impulse response functions are set forth above in Equations 19 and 20.

Figure 7:
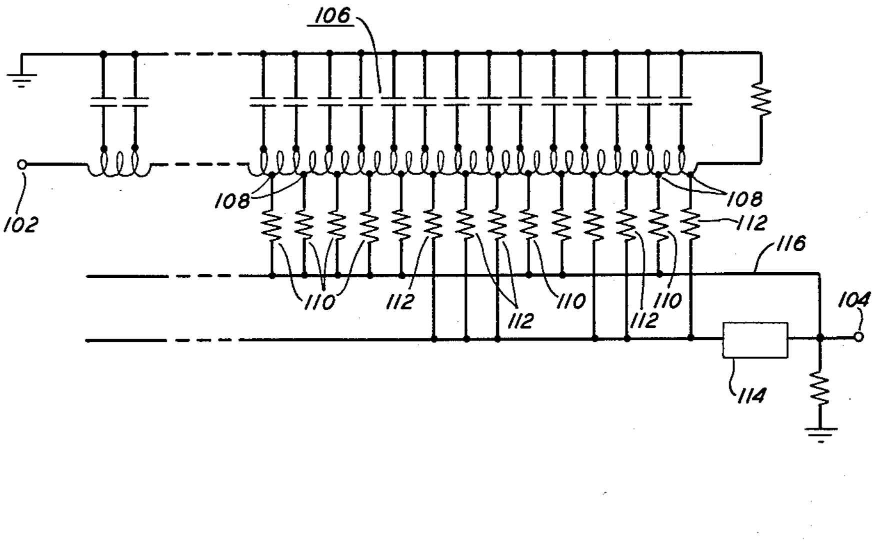
FIG. 7 is a known form of a transferable filter.

In FIG. 7, corresponding to the Blumlein FIG. 5, the input signals are applied to terminal 102 and output signals are derived at the terminal 104. The delay line 106 includes a large number of tapping points 108. In addition, a number of resistors 110 and 112 are connected to the tap 108 on the delay line 106. These resistors serve to couple signals from the delay line 106 to the output circuit 104. As an impulse of unity amplitude passes down the delay line 106, the increments which appear at the output terminal 104 are determined by the magnitude of the resistors 110 and 112 which couple the delay line to the output circuit. By making the taps on the delay line sufficiently close to follow the impulse response characteristic of a desired filter, nearly any impulse response may be obtained with the desired accuracy. In order to produce negative as well as positive output signals, the polarity reversing device 114 is included in one of the leads coupled to the output circuit 104. Thus positive increments are connected to lead 116 by resistors 110, whereas negative increments are coupled to the output lead 104 through the reversing component 114.

Figure 8:
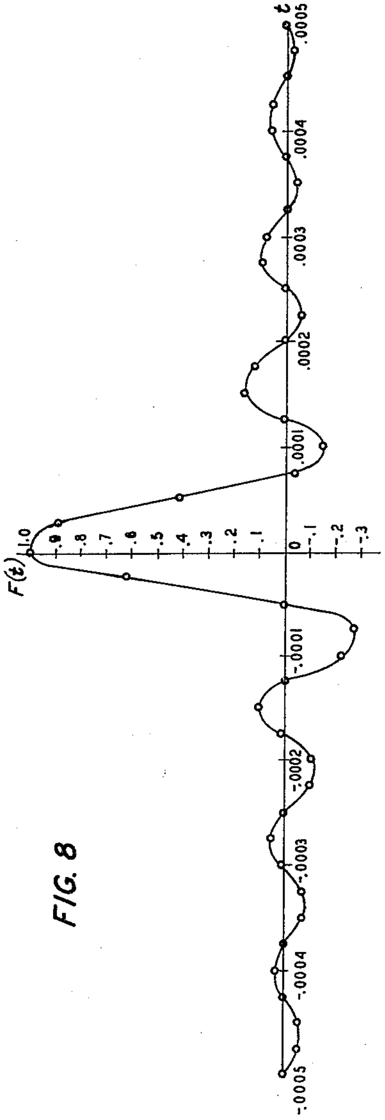
FIGS. 8 and 9 are characteristics for the filter circuits of FIG. 1, which are useful in computing the values for the circuit of FIG. 7.
Figure 9:
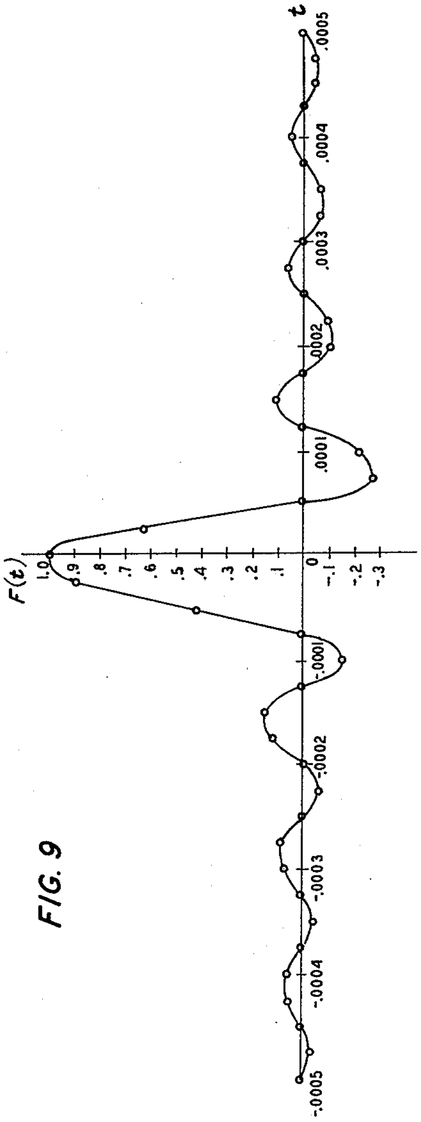

In FIGS. 8 and 9 the normalized impulse response characteristics given by Equations 19 and 20 are presented. FIG. 8 is the impulse response characteristic for the "even" filter 58 of FIG. 1, and FIG. 9 is the impulse response characteristic for the "odd" filter circuits 60 of FIG. 1. With reference to FIG. 7, the delay line taps 108 would be spaced with approximately the frequency shown by the specific points on the curves of FIGS. 8 and 9. In addition, the magnitude of the resistors 110 and 112 would be determined by the amplitude of the characteristics shown in FIGS. 8 and 9 and the connection to lead 116 or to the reversing component 114 would be determined by the polarity of the characteristics shown in FIGS. 8 and 9 at each of the points.

It may be noted in passing that both the form of filter shown graphically in FIGS. 5 and 6 and the transversal filter of FIG. 7 require delay circuitry in their implementation. Thus a phase characteristic of the type shown in FIGS. 3 and 4 without delay is not physically realizable and additional delaying circuitry must be incorporated into the filter structures.

Figure 10:
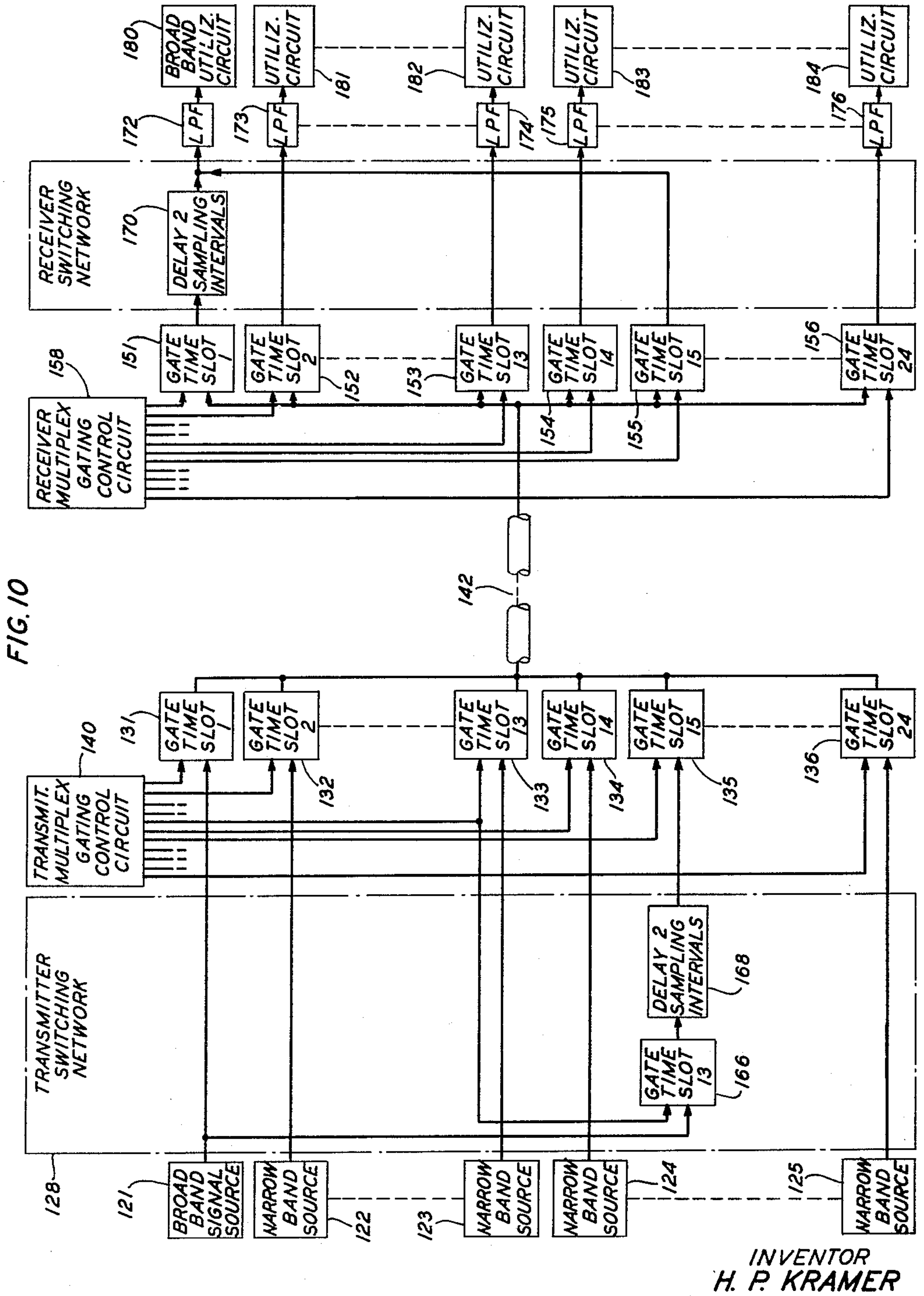
FIG. 10 is an embodiment of my invention in which the broadband signal source is sampled at a uniform rate and in which padding delays are employed to shift the time spacing of the sampled signals.

Another arrangement for avoiding distortion which otherwise may arise from the use of nonuniformly sampled multiplex gates is shown in FIG. 10. In the circuit of FIG. 10 a single broadband signal source is shown at 121. Additional narrow band signal sources are shown at 122 through 125. As in the illustrative circuit of FIG. 1, however, it is understood that the system of FIG. 10 is a 24-channel time division multiplex system and that it can, therefore, handle up to twenty-four narrow band signal sources. The multiplex circuit includes a group of transmtiter multiplex gates such as 131 through 136, and a transmitter multiplex gate control circuit 140. The active signal sources are connected to the common transmission line 142 through assigned gates 131 through 136. The boardband transmission line 142 couples the interleaved multiplex signal samples from the transmitting gates 131 through 136 to the receiver multiplex gates 151 through 156. The receiver multiplex gates are enabled at the proper time through the control of the receiver multiplex gate control circuit 158.

Signals derived from a narrow band signal source such as source 125 are gated through a receiver multiplex gate such as gates 152, 153, 154 and 156 and through suitable low pass filters 173—176 to narrow band utilization circuits 181—184, respectively.

At the time that it is desired to establish a signal path from the broadband signal source 121 to the broadband utilization circuit 180, it is presumed that no uniformly spaced multiplex channels are available. Thus, for example, while the gate 131 is available, the gate 133, enabled at uniformly spaced intervals before and after gate 131, is not available. However, the gate 135 is available, and circuitry for establishing a path through gates 131 and 135 may be set up. This circuitry includes the gate 166 and the delay circuit 168.

Thus, in order to avoid distortion in accordance with the embodiment of the invention shown in FIG. 10, the broadband signal source is sampled at uniform intervals and the signal is then delayed, to be transmitted in an available time slot. In the instant example, the broadband signal source is connected to gate 131 and is sampled in the first time slot of each multiplex cycle. As mentioned above, it would be desirable to use the thirteenth time slot so that the broadband signal source would be automatically sampled at equal intervals in the first and thirteenth time slots of the cycle of the 24-channel multiplex timing system. However, with a narrow band signal source already assigned to time slot 13, auxiliary gate 166, which is also enabled in time slot 13, is connected to the broadband signal source. The broadband signal source 121 is, therefore, sampled at a uniform rate. In order to shift in time the samples transmitted through gate 166 so that they are available for transmission through gate 135 associated with time slot 15, a delay circuit 168 which provides two sampling intervals of delay, is introduced between the gate 166 and the gate 135. This delay circuit 168 shifts the samples from the occupied thirteenth time slot to the available fifteenth time slot.

Following transmission over the common transmission channel 142, the samples derived from broadband signal source 121 appear at the outputs of gates 151 and 155, which are operated at nonuniform intervals. In order to restore uniform spacing between the signal samples, the delay circuit 170 is connected to gate 151. As in the case of the delay circuit 168 included in the transmitter switching circuit, the delay circuit 170 includes two sampling intervals of delay. The signals from gate 155 and from the delay circuit 170 are then combined and applied to the low pass filter 172.

It may be noted in passing that the low pass filter 172 has a cut-off frequency of approximately 8,000 cycles, as compared with a cut-off frequency for the low pass filters 173 through 176, for example, of 4,000 cycles.

Following reconstruction of the original signals by the low pass filter 172, they are applied to the broadband utilization circuit 180.

It is to be understood that the above-described arrangements are illustrative of the application of the principles of the invention. Numerous other arrangements may be devised by those skilled in the art without departing from the spirit and scope of the invention.

For example, it is possible to provide for transient broadband service in a narrow band multiplex system; i.e., time slots are assigned to a broadband source only when such service is requested, so that different time slots may be assigned at each request, dependent upon the instantaneous availability of time slots in the system. For such service, the delay components must be adjustable so as to provide the essential correction dependent upon the particular intervals between assigned time slots. The particular delay required in any given instance, however, must conform to the instant invention in order to provide a distortion-free reconstruction of the original signal sampled at nonuniform intervals.

What is claimed is:

1. In a multiplex transmission system, a plurality of gates, a transmission channel connected in common to said plurality of gates, a signal source, means for selectively connecting said signal source to particular ones of said plurality of gates, means for enabling successively said plurality of gates with the time spacing between successive gates being nonuniform to transfer samples of signals directly from said source through said gates to said common transmission link, a plurality of receiving gates, filter means connected to a lesser number of said receiving gates than said plurality of receiving gates, means for enabling said lesser number of receiving gates to apply said signal samples transmitted through said plurality of gates to said filter means in a nonuniform manner with respect to time spacing between successive samples, said filter means comprising a pair of filter circuits each having transmission characteristics distinct from the other for providing phase shifts to said applied signal samples, a utilization circuit, and an adder circuit connected between said utilization circuit and said pair of filter circuits for combining said phase shifted signal samples free of distortion and for applying the combined signal to said utilization circuit.

2. In a multiplex transmission system, the combination in accordance with claim 1 wherein said pair of filter circuits has a frequency cutoff at the maximum frequency to be transmitted over said common transmission channel.

3. In a multiplex transmission system, the combination in accordance with claim 1 wherein said lesser number of said plurality of receiving gates comprises two gates, one filter of said pair of filter circuits receiving said signal samples transmitted through one of said two gates and having a characteristic which will produce a positive phase shift in said signal sample and said other filter of said pair of filter circuits receiving said signal samples transmitted through the other of said two gates and having a characteristic which will produce a negative phase shift.

4. In a multiplex transmission system, a broadband signal source, a narrow band transmission line, a utilization circuit, means for transferring samples directly from said broadband signal source to said narrow band transmission line during discrete sampling periods in a recurring cycle of sampling periods, said discrete sampling periods being nonuniformly spaced in time, means for receiving the broadband signal samples from said narrow band transmission line, filter elements each having an input and an output, means for directly applying said received signal samples in a nonuniform manner with respect to time spacing between successive samples to the inputs of said filter elements, said filter elements each having distinct transmission characteristics for reconstituting said broadband signal free of distortion from said signal samples applied to said filter elements in said nonuniform manner, a utilization circuit and a circuit for adding the outputs of said filter elements connected between said filter elements and said utilization circuit.

5. In a multiplex transmission system, the combination in accordance with claim 4 wherein said filter elements have a frequency cutoff at the maximum frequency to be transmitted over said narrow band transmission line and comprise a positive phase shifting filter circuit and a negative phase shifting filter circuit.

6. In a multiplex transmission system, a narrow band transmission channel, a broadband signal source, means for applying signal samples from said broadband signal source to said narrow band transmission channel in a nonuniform manner with respect to time spacing between successive samples, multiplex gating means for receiving in said nonuniform manner said broadband signal samples, a broadband utilization circuit, first and second filter circuits for receiving in a nonuniform manner with respect to time spacing between successive samples said signal samples derived from said broadband input signal source and for coupling said samples to said broadband utilization circuit, said first filter circuit having a transmission characteristic to induce positive phase shifts in applied signal samples, and said second filter circuit having a transmission characteristic to induce negative phase shifts in applied signal samples with respect to the phase shift to samples provided by a linear delay circuit.

7. A combination as defined in claim 6 wherein said first and second filter circuits have a frequency cutoff at the maximum frequency to be transmitted over said narrow band transmission channel, said first filter circuit having a characteristic substantially conforming to the expression $$\Psi_0(f)=\frac{1}{\cos \pi\alpha}e^{-\pi j\alpha f/|f|}$$

and said second filter circuit having a characteristic substantially conforming to the expression $$\Psi_1(f)=\frac{1}{\cos \pi\alpha}e^{\pi j\alpha f/|f|}$$

where $\alpha f$ equals the amount in time which the nonuniformly spaced time intervals between successive samples are displaced from uniformly spaced time intervals.

References Cited in the file of this patent

UNITED STATES PATENTS

| | | |
|---|---|---|
| 2,495,739 | Labin et al. | Jan. 31, 1950 |
| 2,564,419 | Bown | Aug. 14, 1951 |